Patented Aug. 6, 1929.

1,723,581

UNITED STATES PATENT OFFICE.

AARON RUDERMAN, OF NEW YORK, N. Y.

PAPER-COATING COMPOSITION.

No Drawing.   Application filed November 6, 1924. Serial No. 748,277.

This invention relates to a coating composition especially applicable to paper and similar substances to make them grease and water proof.

Hitherto various patents have been granted covering protective coatings which when applied commercially were either not universally applicable or else were too expensive, and very often were objectionable because volatile and inflammable organic solvents were employed. In my process I have attempted to eliminate these phases and have succeeded in establishing a coating which is not only commercially applicable, but commercially inexpensive.

In using rubber latex difficulty has been encountered in applying the latex to the paper so that it later could not be peeled off readily. A further difficulty has been encountered by reason of the fact that the rubber latex readily becomes tacky, and in order to overcome this difficulty I have had to combine the latex with certain ingredients to counteract this tendency.

In my invention the basic ingredient is commercially known as "rubber latex," a liquid product obtained from certain trees. I provide means for taking this milk or rubber and adding certain ingredients in such a way that the original qualities of the rubber are in no way impaired, thereby obtaining a highly efficient deposited rubber in the form of a thin membrane partially absorbed within the web of textile or paper, and partially upon the surface. The degree of this absorption depends upon the method of application employed.

In order to enhance the capacity of the rubber latex to adhere or stick to the surface to which it is applied, I may employ any one or more of the following ingredients:

1. Glue or other gelatinous material.
2. Starches.
3. Casein.
4. Viscose.

In order to overcome the tendency of the latex to become tacky, I may use any one or more of the following ingredients:

1. Clay or any other inert mineral.
2. Sodium silicate.
3. Paraffin.
4. Alum.

On occasion it may be desirable to add ingredients which will cause vulcanization of the rubber. These ingredients are:

1. Sodium polysulfide.
2. Sulfurous acid and hydrogen sulfide or similar agents.
3. Hydrogen persulfides.
4. Sulfur chloride with carbon tetrachloride.
5. Sulfur powder.

In using sulfur chloride I also employ sodium carbonate, which makes the coating solution more penetrable and also acts to neutralize any hydrochloric acid formed whenever sulfur chloride is used. The use of formaldehyde retards the rate of vulcanization and a limited quantity is preferably used.

Some of these agents may be added directly to the bath, and some are applied after the basic material, together with the glue or starch, has been deposited upon the web, and during the process of drying.

After the coating has been deposited and properly dried, it is oftentimes desired to give a smoothing effect by passing the web through a set of calender rolls. This so-called calendering, however, tends to bring out the tackiness of the sheet. In order to overcome this tendency, I introduce on the sheet, just before the sheet enters the calendering rolls, a solution of any of the following substances:

1. An alum solution, or any other acid salt.
2. Starch solution.
3. Tannic acid.
4. Waste sulfite liquor.
5. Glue and calcium chloride, or glue and glycerol.
6. Glue and glycerol and clay.

Besides the above solutions, the following other methods are applicable:

1. Clay or starch is sprinkled on the web prior to entering the calender rolls. I prefer, also, to subject the web to the polishing action of a felt brush revolving rapidly counter to the direction in which the web travels. The brush aids in spreading out the clay or starch, evenly working it into the web. In fact, its use may dispense entirely with the use of calender rolls.

2. The web of latex covered paper may be passed through a bath of paraffin or other similar wax which may contain two or three per cent of sulfur chloride.

Having described means and methods for overcoming certain definite reactions that occur when the coating of rubber latex is applied to the web, I shall now describe in detail certain solutions which I propose to apply to the sheet.

I have found that though I may use rubber latex alone that far more beneficial results are obtained with the addition of glue or starch. I have found that these substances act as protective colloids, thus not only stabilizing the emulsion but making it possible to use salts of heavy metals, acid salts, and even mineral acids, without clotting the latex. It is to be understood that I do not wish to limit myself to the use of glue and starch, but these terms include all gelatinous, starchy, and albuminous materials which generally behave as protective colloids and adhesives.

My solutions may consist of any of the following or combinations of the same:—

1. 2 to 2½% of glue to 10 to 12% of rubber latex. To this I add 0–20% clay or starch or a mixture thereof. I mix the glue solution and the latex and then add the clay or starch, either dry or else previously moistened. I may increase the proportion of glue without imparing the flexibility of the coated web by adding calcium chloride or glycerol to the glue and latex mixture.

2. To the glue latex solution may be added sodium polysulfide, about 0.5%, with or without subsequent addition of a small quantity of acid or acid salt to precipitate S. Sulfur may be introduced by cautious addition of small quantities of sulfurous acid or sulfur dioxide gas, followed by passing in of hydrogen sulfide. The amounts of sulfurous acid that may be introduced will depend on the quantity and the quality of the glue, or other protective colloid, used. Hydrogen persulfide may be added.

3. To the glue and latex solution may be added up to 3% of a commercial sodium silicate solution. Larger quantities may be used and excess sodium silicate may be precipitated with alum and the silicic acid can substitute the clay in whole or in part.

4. To the glue and latex solution may be added any of the heavy metals which can be precipitated either as the sulfide or as the base by addition of hydrogen sulfide. These sulfides may substitute the clay and also serve to introduce color.

5. To the glue and latex solution may be added formaldehyde, casein solution, or a solution of viscose. Each of these serves to reduce the tackiness. The use of casein with formaldehyde or alum makes the coating better water resistant. Casein and viscose may be used without the addition of glue or may partly substitute glue.

6. Oil emulsions may be added to the glue and latex solution. Such an emulsion may be used to make the web translucent and to reduce the tackiness.

7. When the glue latex coating on the web has dried it may be coated with paraffin in the ordinary manner. The paraffin may contain a vulcanizing agent, such as sulfur chloride. When sulfur chloride is used the paraffin may be substituted by carbon tetrachloride.

Instead of the glue latex combination I may use a combination of equal amounts of starch and latex based on solid matter, which I prepare in either of the following ways:—

1. The starch in water suspension is heated with constant stirring to about 75° C. and after this point is reached the latex is added and heating continued until the starch jells. In continuing the heat the same may be increased so as to produce boiled starch, if desired, though this is not necessary unless quick results are desired. The amount of starch used in making this solution should be but two-thirds of total amount of starch to be used. The other one-third is added after the latex has been added. This addition of starch tends to reduce tackiness of the substance when deposited on the sheet in the form of a coating.

2. The other method of preparation consists in heating the aqueous starch solution up to the point where the starch jells (80–85° C., depending on the starch), adding the latex and then the remainder of the starch. The use of sodium carbonate makes the coating solution more penetrative.

While I prefer to use a 50:50 mixture, I do not wish to restrict myself entirely to this proportion. Indeed, in some cases variation from these proportions will be found beneficial. It will depend on the nature of the material being treated and the nature of the final product desired.

3. I may use sulfur, flowers of sulfur or colloidal sulfur, together with the starch latex combination, when I proceed as follows:

I mix thoroughly the dry starch and the sulfur, add cold water, stir the solids in suspension, and then proceed in the manner described under 2. The coated paper may then be exposed to ultra violet light. The other methods of introducing sulfur are also applicable here.

4. To the rubber latex mixture described under 1 or 2, I may add when cold, powdered paraffin. However, I prefer to proceed as follows:—

The starch is heated to the gelation temperature. Then I add to this a paraffin emulsion and stir the two together. I then add the rubber latex. The starch paraffin emulsion may be allowed to cool, when the paraffin will be suspended in the starch in very fine particles. The latex may be added then. Many of the modifications described under the glue latex combination are equally applicable here.

Both the glue-latex combination and the starch latex combination with all the modifications described above may be applied on the usual form of ground machine such as is used in the manufacture of grounds or the like in wall paper mills. Some of these modifications may be applied by passing the web through the coating solution and then through squeeze rolls to remove the excess coating material as well as force the material more thoroughly into the web. Wherever paraffin is used, whether mixed with the other coating ingredients or as a secondary coating to overcome tackiness, I prefer to pass the web through hot calender rolls like those of a wax machine of standard construction. However, in my application I am not specifying the exact type of machinery necessary in depositing the material on the web. This will necessarily depend on the nature of the material being coated and on the ultimate quality desired.

In my application I have specified some of the difficulties encountered in the use of rubber latex as a coating material and have provided means for overcoming each. Furthermore, I have specified certain combinations for use together with rubber latex, such material either acting as protective colloids, or in such a way as to improve the quality of the final product or both. But I do not wish to hold myself entirely to these but wish to include any such modifications as may be possible without departing from the virtue of the process or invention.

What I claim is:—

1. A composition of matter for rendering paper waterproof and greaseproof comprising rubber latex, starch in a jelled state, sodium carbonate, a soluble metallic polysulfide, and formaldehyde.

2. A composition of matter for rendering paper waterproof and greaseproof comprising rubber latex, starch in a jelled state, sodium carbonate, a soluble metallic polysulfide, formaldehyde, and sodium silicate.

3. A composition of matter for rendering paper waterproof and greaseproof comprising rubber latex, starch in a jellied state, a soluble metallic polysulfide, an alum, and formaldehyde.

4. A composition of matter for rendering paper waterproof and greaseproof comprising rubber latex, starch in a jelled state, a soluble metallic polysulfide, an alum solution, formaldehyde and sodium silicate.

5. A composition of matter for rendering paper waterproof and greaseproof, comprising rubber latex 10 to 12%, boiled starch 1 to 20%, a soluble metallic polysulfide .5%, sodium silicate 1 to 3%, sodium carbonate and formaldehyde.

AARON RUDERMAN.